US008382870B2

(12) United States Patent
Troxell et al.

(10) Patent No.: US 8,382,870 B2
(45) Date of Patent: Feb. 26, 2013

(54) SELF-CLEANING AIR FILTER

(75) Inventors: Ronald C. Troxell, Clarendon Hills, IL (US); Jason D. Troxell, Clarendon Hills, IL (US)

(73) Assignee: Maradyne Corporation, Cleveland, OH (US)

( * ) Notice: Subject to any disclaimer, the term of this patent is extended or adjusted under 35 U.S.C. 154(b) by 162 days.

(21) Appl. No.: 12/924,352

(22) Filed: Sep. 24, 2010

(65) Prior Publication Data

US 2012/0073251 A1 Mar. 29, 2012

(51) Int. Cl.
*B01D 46/00* (2006.01)
(52) U.S. Cl. .............................. 55/302; 55/310; 55/385.3
(58) Field of Classification Search .................. 55/283, 55/302, 284, 318, 321, 322, 287, 467, 294; 95/20, 278, 279, 280; 96/403, 427; 60/295, 60/296, 300, 303, 311; 366/18, 26, 30
See application file for complete search history.

(56) References Cited

U.S. PATENT DOCUMENTS

| 4,174,204 | A | 11/1979 | Chase |
| 4,214,882 | A | 7/1980 | Brenholt |
| 4,452,616 | A | 6/1984 | Gillingham et al. |
| 4,826,512 | A * | 5/1989 | Fuller ............................. 55/283 |
| 4,836,834 | A * | 6/1989 | Steele ............................. 95/279 |
| 5,338,325 | A * | 8/1994 | Stanelle ......................... 96/400 |
| 5,762,689 | A * | 6/1998 | Hunziker ........................ 95/280 |
| 6,638,344 | B2 * | 10/2003 | Horton et al. ................... 95/280 |
| 7,927,396 | B2 | 4/2011 | Olson et al. |
| 7,947,099 | B2 * | 5/2011 | Valentini ........................ 55/283 |
| 2011/0011042 | A1 * | 1/2011 | Gillingham et al. ............ 55/302 |
| 2011/0252964 | A1 | 10/2011 | Wahlquist et al. |

FOREIGN PATENT DOCUMENTS

WO  WO 2007/149388 A2  12/2007

* cited by examiner

*Primary Examiner* — Duane Smith
*Assistant Examiner* — Minh-Chau Pham
(74) *Attorney, Agent, or Firm* — Fay Sharpe LLP

(57) ABSTRACT

The self-cleaning air filter uses reverse pulse self-cleaning for small scale, small volume air filtration applications, such as vehicles and motorized equipment. The self-cleaning air filter includes a filter casing, a filter element housed within a filter casing, an electronically controlled pulse valve that releases the compressed air pulse, and a pulse pressure relief vent. During the cleaning cycle, the pulse pressure vent opens to vent the compressed air pulse to the atmosphere thereby maintaining the positive pressure differential between the inside and outside of the filter element, which sustains the cleaning action for the duration of the compressed air pulse.

18 Claims, 8 Drawing Sheets

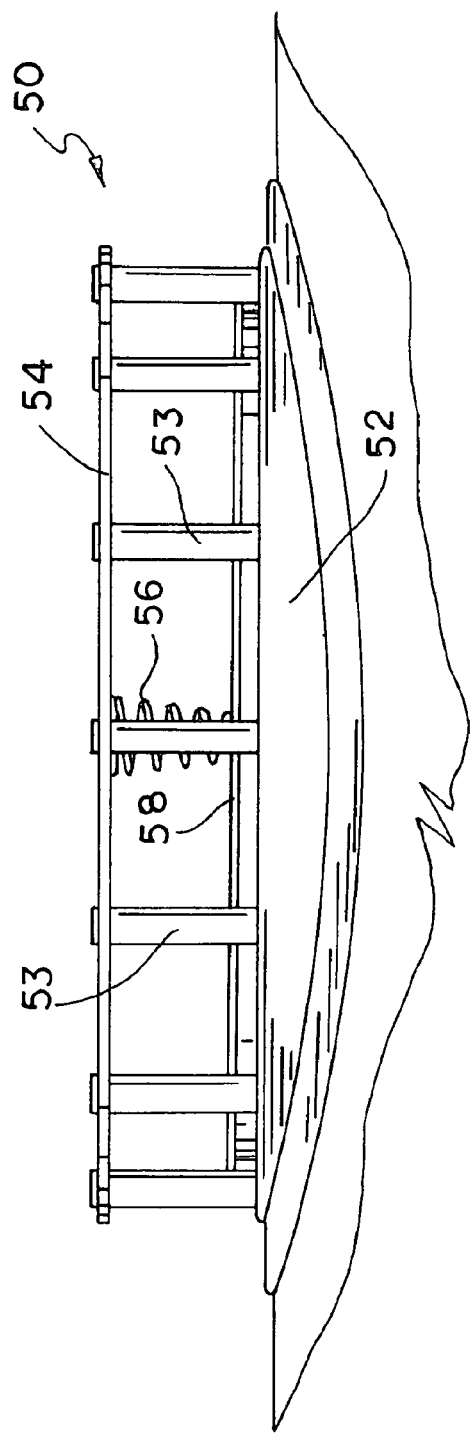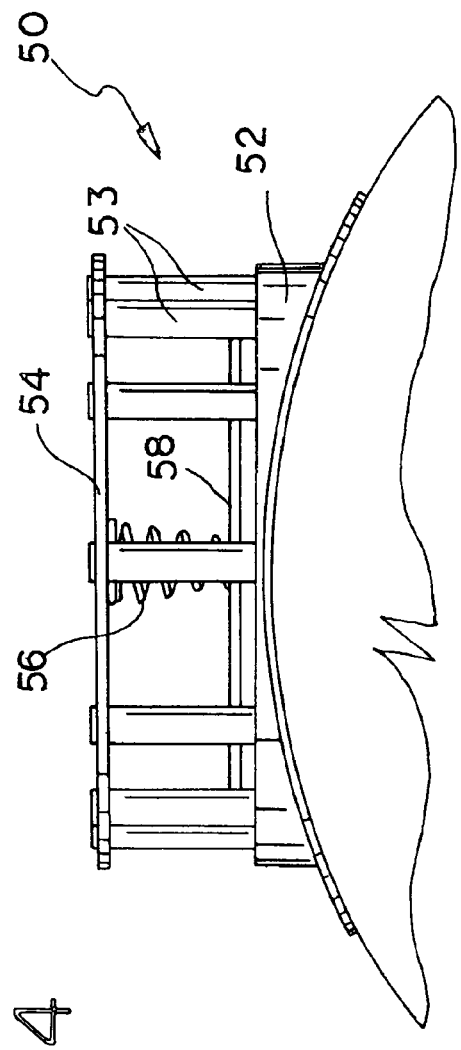
FIG. 4
FIG. 5

SELF-CLEANING AIR FILTER

This invention relates to a self-cleaning air filter, and in particular a self-cleaning air filter for vehicles and motorized equipment.

BACKGROUND OF THE INVENTION

Operating in dusty environments has long been a problem for equipment and vehicles. The respiration of dusty and contaminated air greatly hinders performance and can damage the vehicle or equipment's engines. Even though vehicles and equipment have filter elements that filter the inlet air flow, in extremely dusty environments, these filter elements quickly become caked with dust and debris, which retards and stops the air flow through the filter element to the engine. Consequently, these filter elements must be frequently cleaned to remove the "dusty cake" formed on the outside of filter elements or the entire filter element must be replaced to ensure the proper operation of the equipment and vehicles. In extremely dusty environments, the demand of constantly cleaning and/or replacing filter elements comes at a significant cost of time and money.

A technique commonly referred to as "pulse jet" or "reverse pulse" self-cleaning has been used in industrial and large scale air filtration systems. Reverse pulse self-cleaning involves periodically releasing a quick burst ("pulse") of compressed air into the filter element, which expands through the filter element in the opposite direction of the normal airflow through the filter element. The rapidly expanding compressed air pulse passing out of the filter element dislodges the dust cake collected on the outside of the filter element. While effective for industrial and large scale air filtration systems, reverse pulse self-cleaning, heretofore, has been inoperable for small air filtration systems, such as those for vehicles and other types of motorized equipment. Reverse pulse self-cleaning works in industrial and large scale air filtration systems because of the sheer volume of the filter housing and the volume of the filter housings in relation to the volume of the filter elements.

In industrial and large scale applications, multiple arrays of filter elements are disposed within large volume filter housings. These filter housings are spacious enough that the compressed air pulse can propagate through the filter elements to effectively clean them before energy of the pulse dissipates within the filter housing and the pressure differential equalizes returning the system to its normal filtering operation.

In small scale applications, such as for vehicles and motorized equipment, where space is limited, the filter housings lack the volume in relation to the volume of the filter elements to make reverse pulse self-cleaning operable or effective. In such applications, a single filter element is typically disposed within the limited confines of the filter housing. The filter housings provide little volume around the filter element within which a compressed air pulse can expand and dissipate. Consequently, an expanding compressed air pulse almost instantly equalizes the pressure differential between the inside and outside of the filter element within the filter housing, which prematurely terminates the expansion of the pulse through the filter element. As a result, the effectiveness of the pulse jet self-cleaning action is lost or greatly reduced.

SUMMARY OF THE INVENTION

The present invention provides a reverse pulse self-cleaning air filter for use in small scale, small filter volume applications, such as for vehicles and other motorized equipment. In one embodiment of this invention, the self-cleaning air filter includes a filter casing, a filter element housed within a filter casing, an electronically controlled pulse valve that releases the compressed air pulse, and a pulse pressure relief vent. The pulse pressure vent enables the air filter's use of the reverse pulse self-cleaning. During the cleaning cycle, the pulse pressure vent opens to vent the compressed air pulse to the atmosphere thereby maintaining the positive pressure differential between the inside and outside of the filter element, which sustains the cleaning action for the duration of the pulse. The pulse pressure vent compensates for the filter casing's small confined volume where the compressed air pulse is normally dissipated in large industrial systems by venting the compressed air pulse from the casing. Without the pulse pressure vent venting the compressed air pulse to the atmosphere, the pressure differential between the inside and outside of the filter element would quickly equalize within the confined space of the filter casing, thereby prematurely interrupting the cleaning action provided by the compressed air pulse.

These and other advantages of the present invention will become apparent from the following description of an embodiment of the invention with reference to the accompanying drawings.

BRIEF DESCRIPTION OF THE DRAWINGS

The drawings illustrate an embodiment of the present invention, in which:

FIG. 4 is a side view of the pressure relief valve of FIG. 1;

FIG. 5 is an end view of the pressure relief valve of FIG. 1;

DESCRIPTION OF THE PREFERRED EMBODIMENT

Figure 1:
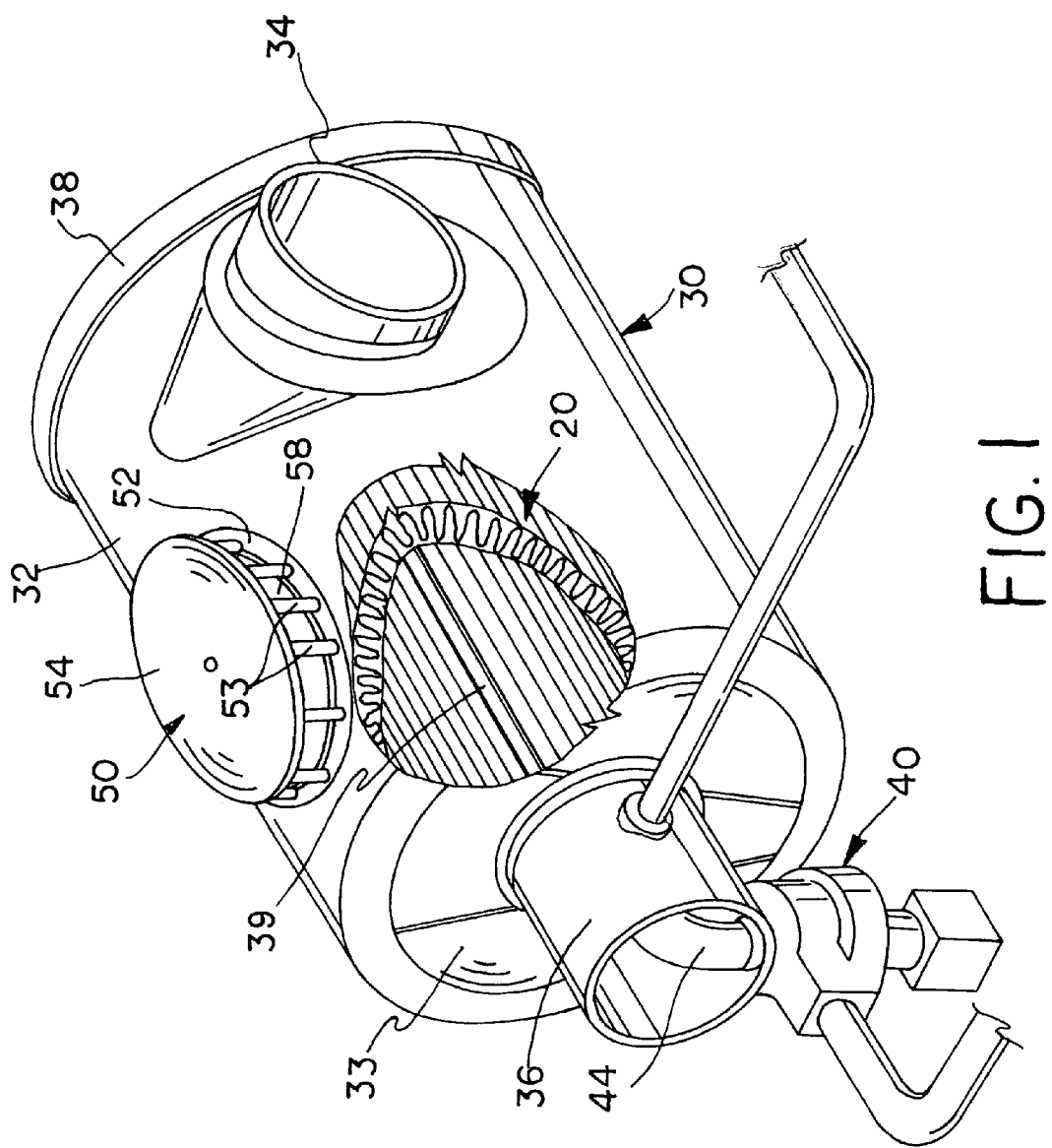
FIG. 1 is a perspective view of an embodiment of the air filter of this invention.
Figure 2:
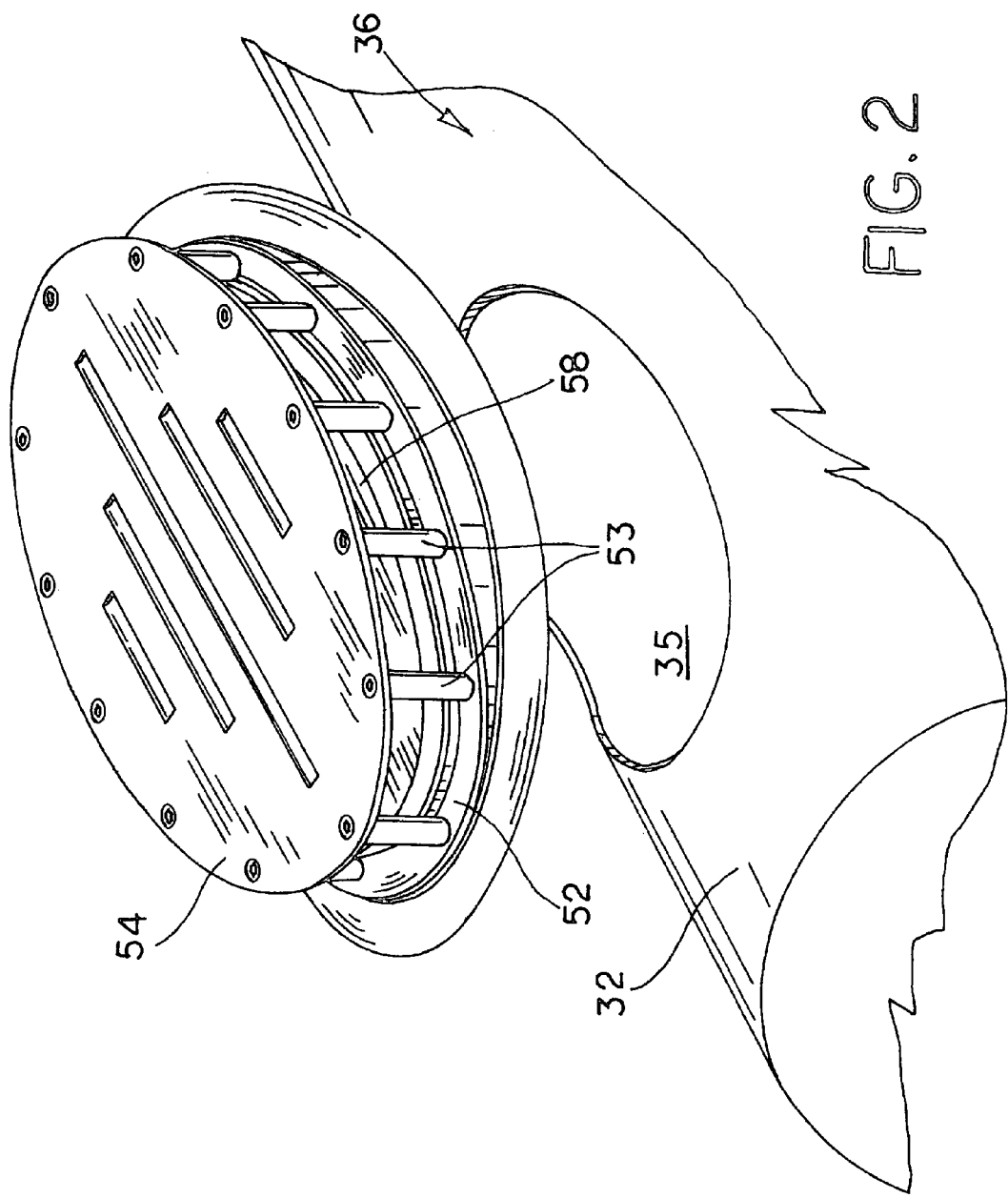
FIG. 2 is a partial exploded view of the air filter of FIG. 1 showing the pressure relief valve and a portion of the filter casing.
Figure 3:
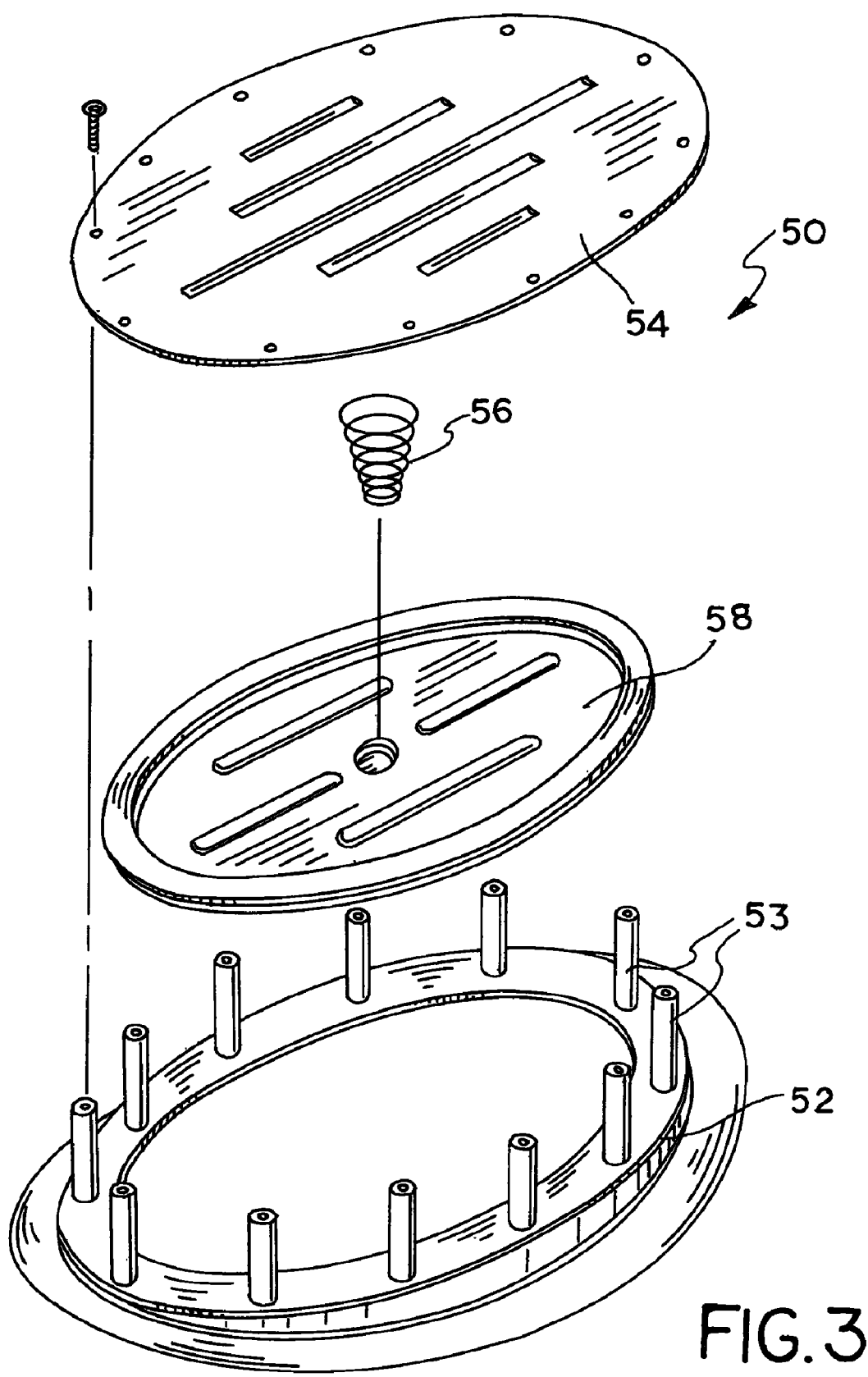
FIG. 3 is an exploded view of the pressure relief valve of FIG. 1.
Figure 6:
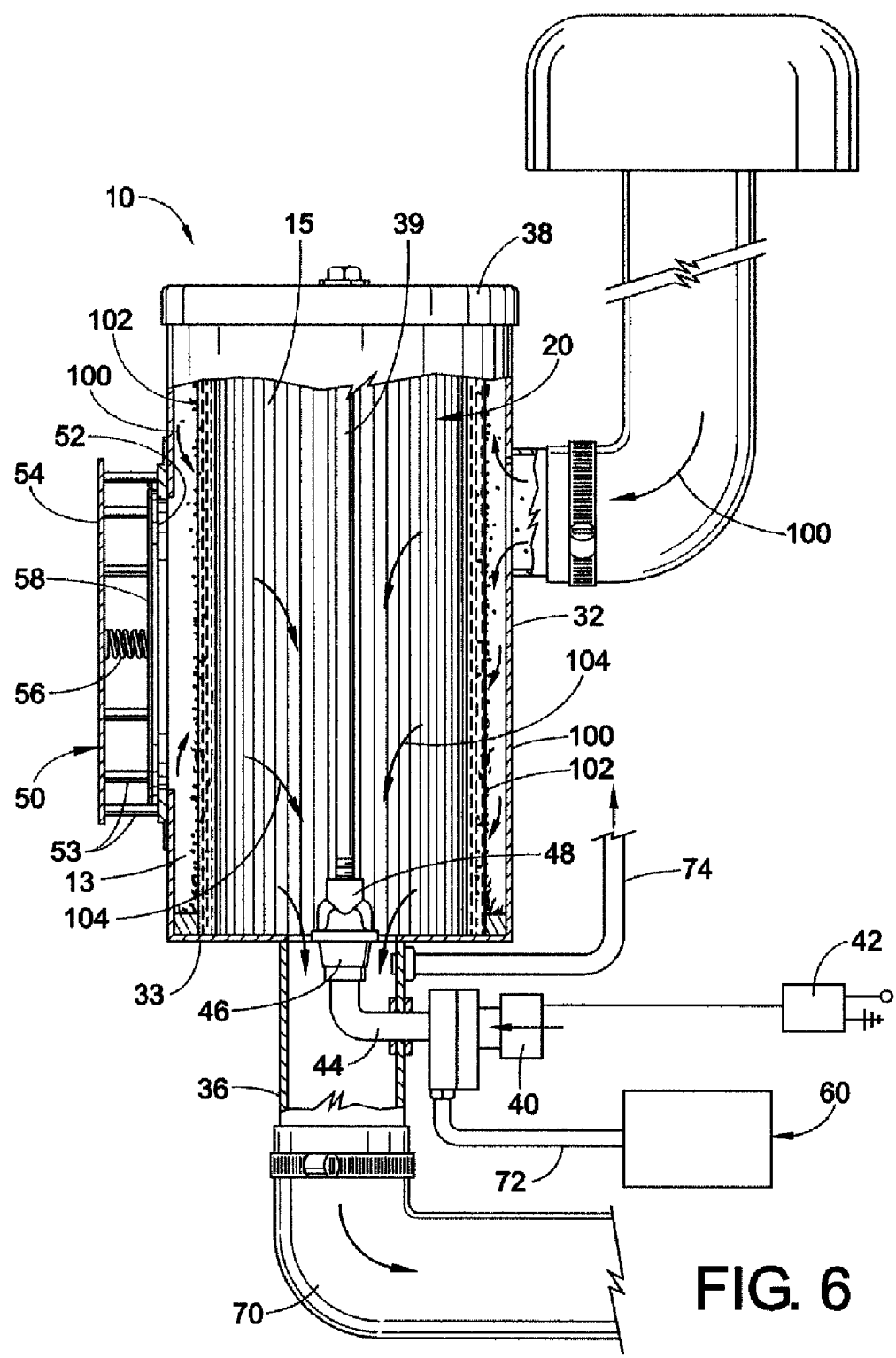
FIG. 6 is a side sectional view of the air filter of FIG. 1 shown during the normal filtering cycle.
Figure 7:
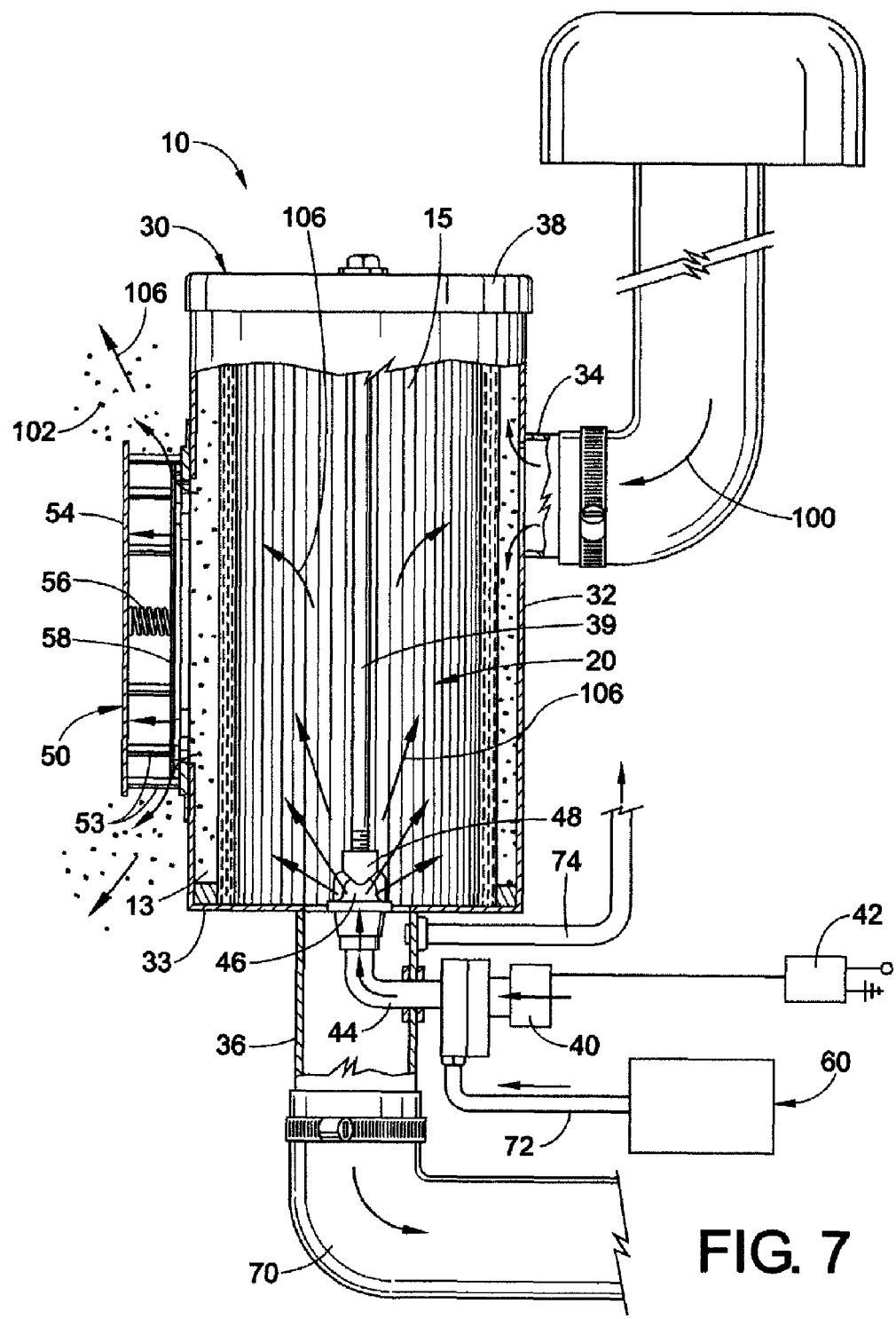
FIG. 7 is a side sectional view of the air filter of FIG. 1 shown during the cleaning cycle.

FIGS. 1-9 illustrate an embodiment of the self-cleaning air filter of this invention, which is designated generally as reference numeral 10. As shown, air filter 10 includes a tubular filter element 20 disposed within a cylindrical filter casing 30. Filter element 20 is of conventional design and function having a tubular sidewall of pleated filter material, which collects dust and debris as air passes through. Filter element 20 is constructed of synthetic fibers rather than conventional paper. Filter element 20 is axially centered within filter casing 30. The tubular sidewall of filter element 20 is inset from the casing sidewalls defining an open space 13 around the outside of the filter element. The tubular sidewall also defines an open interior space 15 within filter element 20. Filter casing 30 has an open end enclosed by a removable lid 38. Lid 38 allows filter element 20 to be replaced as desired. Lid 38 is secured to casing 30 by connecting rod 39, which extends axially through filter element 20. Filter casing 30 includes an exterior surface 32 and an inlet port 34, through which dust laden air 100 from the atmosphere enters one end (the "inlet end") of air filter 10 and an outlet port 36 through which clean filtered air 104 exits the opposite end (the "outlet end") of the air filter. As shown, inlet port 34 extends tangentially from the casing sidewall at the inlet end of filter casing 30 and an outlet port 36 that extends axially from the casing bottom 33 at the outlet end of casing 30. Outlet port 36 allows for connection to the air intake and fuel induction system of a combustion engine by a hose, pipe or duct, although air filter 10 can be integrally mounted to the engine's air intake and fuel injection systems as desired.

A pulse valve 40 is mounted to the side of outlet port 36 and operably connected to a compressed air source 60. Pulse valve 40 releases short blasts or pulses of compressed air from the compressed air source within filter element 20, which facilitates the self-cleaning action of air filter 10. In one embodiment, pulse valve 40 is a conventional solenoid type control valve where a solenoid (not shown) actuates a diaphragm (not shown) to open and close the valve. Pulse valve 40 is mounted to the side of outlet port 36. An elbow 44 connects the output of pulse valve 40 to a nozzle head 46, which is centered along the longitudinal axis of filter casing 30. Nozzle head 46 includes a conical deflector 48, which deflects the pulse of compressed air radially through filter element 20. Pulse valve 40 is under the control of an electronic control module 42, which actuates the solenoid to open and close the valve at predetermined intervals. Control module 42 is electrically powered by any available internal or external power source, but is generally powered using the electrical power source found in the equipment or vehicle. Control module 42 is of conventional design, well known in the art, and may include processing circuitry, memory and an I/O interface for connection to other control system sensors and devices. The processing circuitry generally includes a suitable general purpose computer processing circuit, such as a microprocessor and its associated circuitry. The processing circuit is operable to carry out the operations attributed to it herein. Within the memory are various program instructions. The program instructions are executable by the processing circuit and/or any other components of the control module 42 as appropriate. If desired, one or more of the components of the control module 42 may be provided as a separate device, which may be remotely located from the other components of the control module.

Air filter 10 also includes a spring loaded pulse pressure vent (PPV) 50, which vents the compressed air pulse from filter casing 30 during the self-cleaning cycle of air filter 10. PPV 50 also acts as a vent for the dust removed during cleaning to be blown out of the housing. PPV 50 vents the over-pressure on the outside of filter element 20 from the compressed air pulse so that a pressure differential is maintained between the inside and outside of the filter element so that the cleaning action is maintained through the cleaning cycle. PPV 50 also acts as a vent for the dust removed during cleaning to be manually blown out of filter casing 30. PPV 50 is mounted between the inlet and outlet ends of filter casing 30 within an opening 35 in the casing sidewall. PPV 50 includes an annular nozzle ring 52, which is securely seated within opening 35 of filter casing 30. A plurality of spacers or posts 53 extending from nozzle ring 52 suspend a cover plate 54 over opening 35. A helical spring 56 biases a pliable diaphragm 58 against nozzle ring 52 to hold PPV 50 closed sealing filter casing 30. Spring 56 is selected so that PPV 50 opens at a predetermined positive pressure within filter casing 30.

During the normal filtering cycle (FIG. 6), the operation of the combustion engine creates a negative pressure differential between the inside and outside of filter element 20, which draws the airflow through air filter 10. Dust laden air from the atmosphere enters air filter casing 30 through inlet port 34. The dust laden air surrounds filter element 20 in area 13 and is drawn inward through the filter element 20 where dust and debris collect on the outside of the filter element. The now "filtered" air exits air filter 10 to the engine through outlet port 36. As shown, PPV 50 is closed during the normal filtering cycle.

During the cleaning cycle (FIG. 7), pulse valve 40 releases a short powerful blast of compressed air (the "compressed air pulse") into filter element 20, which dislodges dust and debris 102 from the filter element into area 13 thereby providing the self-cleaning action of air filter 10. Nozzle head 46 directs the compressed air pulse onto the deflector 48, which projects the compressed air pulse outward radially into the filter element. The compressed air pulse creates a high pressure wave that expands outward radially through filer element 20 as it moves along the length of filter element 20 from the outlet end to the inlet end. The high pressure wave created by the compressed air pulse briefly inverts the pressure differential between the inside and outside of filter element 20 and temporarily reverses the direction of air flow through filter element 20 thereby providing the cleaning action. In releasing the compressed air pulse, pulse valve 50 opens only for a brief duration generally 5-10 milliseconds. The cleaning cycle is maintained only as long as the positive pressure differential between the inside and outside of the filter element can be maintained. Consequently, the cleaning cycle lasts less than a few tenths of a second.

During the brief cleaning cycle, the over pressure of the compressed air pulse expanding through filter element 20 immediately opens PPV 50. PPV 50 opens once the internal air pressure of filter casing 30 reaches its predetermined pressure. PPV 50 opens to vent the compressed air pulse to the atmosphere thereby maintaining the now positive pressure differential between the inside and the outside of filter element 20. Venting the compressed air pulse to the atmosphere sustains the cleaning action for the entire duration of the pulse and allows the high pressure wave of the compressed air pulse to traverse the length of the filter element providing an efficient cleaning of the entire filter element. Without PPV 50 venting the compressed air pulse to the atmosphere, the pressure differential between the inside and outside of filter element 20 would quickly equalize within the confined space of filter casing 30 thereby interrupting the cleaning action provided by the compressed air pulse. Once the compressed air pulse has been vented from filter casing 30, the positive pressure differential is lost and the vacuum draw from the outlet port 36 quickly reestablishes the negative pressure differential between the inside and outside of the filter element, whereby the air flow direction through air filter 10 reverts back and the normal filtering cycle is reestablished.

Figure 8:
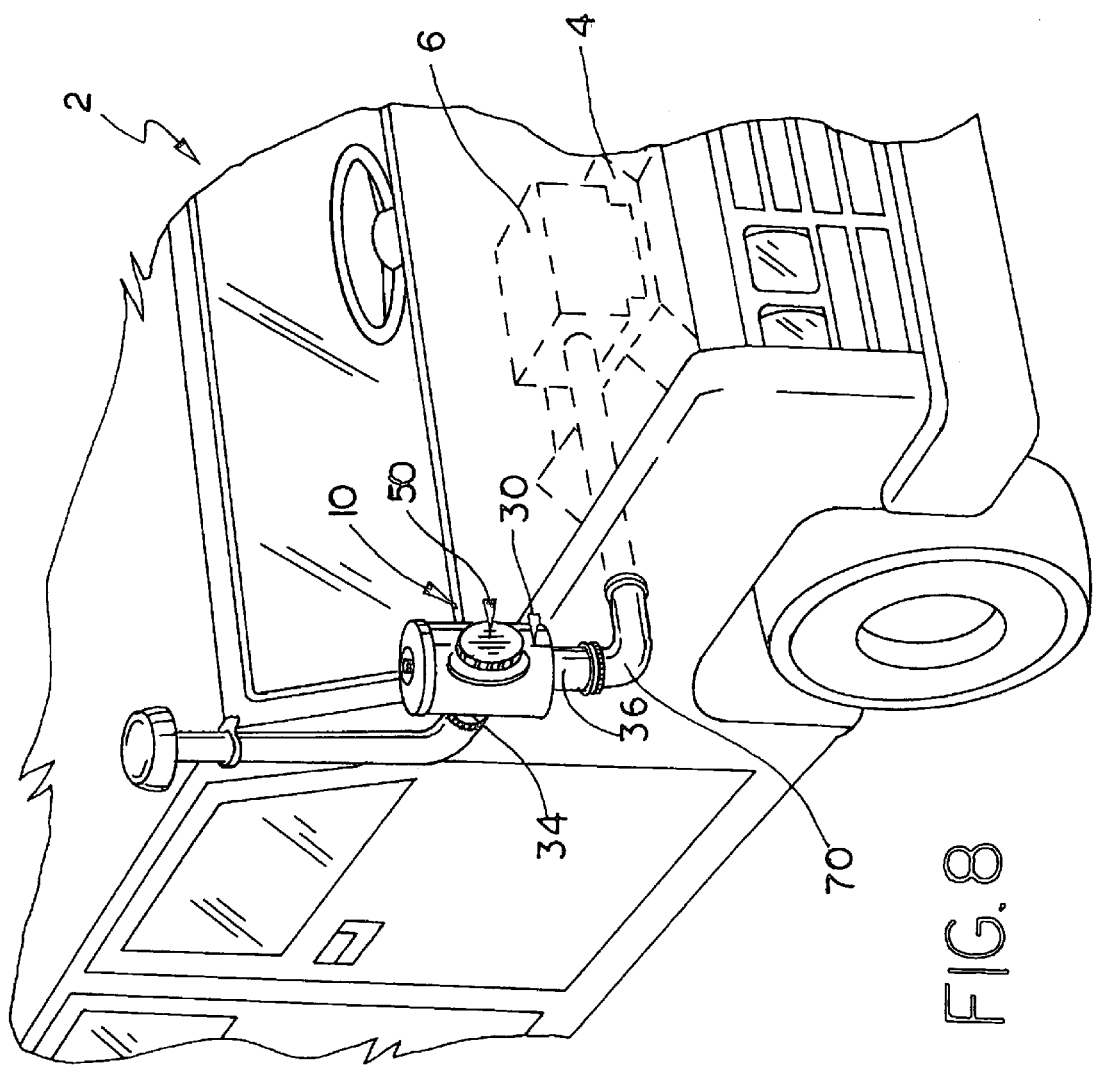
FIG. 8 is a partial perspective view of an exemplary application of the air filter of FIG. 1 used in a typical military style vehicle.
Figure 9:
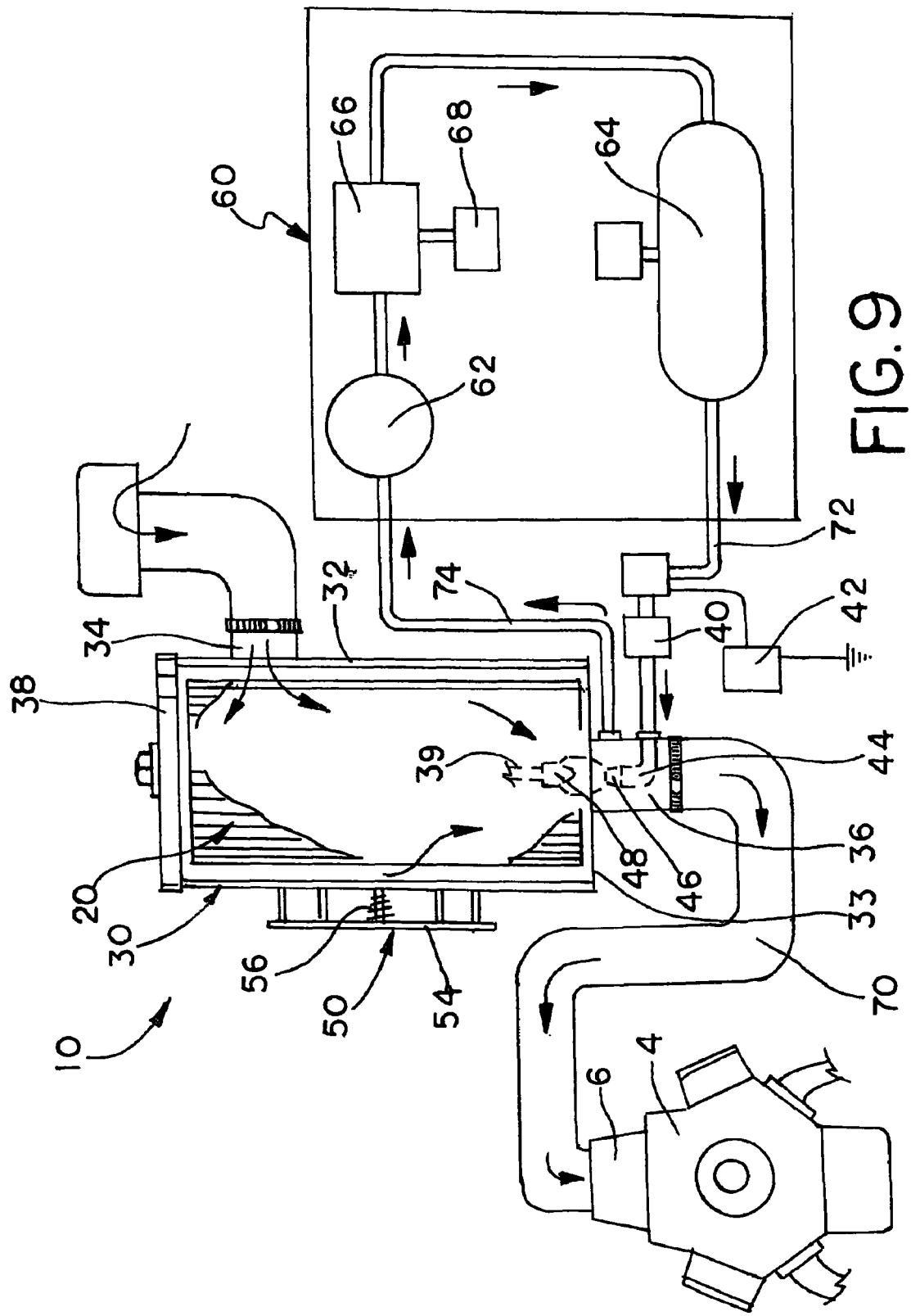
FIG. 9 is a simple schematic of the air filtration system using the air filter of FIG. 1.

In certain embodiments, air filter 10 forms part of an integrated air filtration system in equipment or vehicles powered by any internal combustion engine that operates in environments with extremely high contents of dust, sand and other particulate in the atmosphere. By way of example only and for simplicity of illustration and explanation, FIGS. 8 and 9 illustrate the application of air filter 10 to an air filtration system of a military type vehicle 2. In other embodiments, the air filtration system and the air filter may take other forms and be adapted for the desired application within the scope of this invention.

FIG. 8 depicts air filter 10 mounted to vehicle 2 outside of the engine compartment. The compressed air source (not shown in FIG. 8) is typically mounted to the vehicle undercarriage or within the engine compartment, which contains an engine 4. It should be noted that in other applications, air filter 10 and the compressed air source may be located in any available space and suitable location on, in or outside of the vehicle or equipment as desired for the particular application.

FIG. 9 depicts a schematic of air filter 10 incorporated into an air filtration system of vehicle 2. Pulse valve 40 is connected to compressed air source 60 by air line 72. Another air line 74 supplies compressed air source 60 with filtered air from outlet port 36 of air filter 10 thereby ensuring that the volume of compressed air supplied back to pulse valve 40 is contaminant free. A hose, pipe or duct 70 connects outlet port 36 of air filter 10 to the engine's air intake and fuel injection system 6.

Compressed air source 60 supplies the volume of clean compressed air to air filter 10 from which the compressed air pulse is released within filter element 20 to facilitate the self-cleaning action. The necessary volume and pressure of the compressed air supplied from the compressed air source is determined by several factors, including, but not limited to the volume and configuration of air filter 10, the type of filter element 20, the volume and properties of dust within the inlet airflow, and the frequency of the air filter's cleaning cycle. Air filter 10 can be connected to any suitable and available compressed air source, whether specifically dedicated to supplying the air filter or one presently existing in the equipment or vehicle application that is available to supply the air filter. As shown, compressed air source 60 includes a compressor unit 62, a storage tank 64, a compressed air dryer 66 and moisture drain switch 68. Compressed air source 60 may also include other ancillary components (not shown), such as, but not limited to, compressed air filters, water purge valves, pressure gages and switches, hoses, lines, clamps and fittings. Generally, the components which make up the compressed air source 60 are of conventional design well known in the art. Compressor unit 62, storage tank 64 and other components of compressed air source 60 are selected so that the compressed air source supplies air filter 10 with the volume of clean, compressed air necessary for generating the required compressed air pulse within the air filter.

One skilled in the art will note that this invention enables the use of reverse pulse self-cleaning in small scale applications, such as for vehicles and motorized equipment. The pulse pressure vent compensates for the filter casing's small confined volume where the compressed air pulse is normally dissipated in large industrial systems by venting the compressed air pulse from the casing. The pulse pressure vent opens at a preset positive pressure so that the compressed air pulse vents to the atmosphere once it passes through the filter element. The pulse pressure vent maintains the positive pressure differential between the inside and outside of the filter element, which sustains the cleaning action during the cleaning cycle. Without the pulse pressure vent, the compressed air pulse would almost instantly expand within the confined volume of the filter casing and equalize the pressure differential between the inside and the outside of the filter element abruptly terminating the cleaning action before the pulse could clean the entire filter element. Venting the compressed air pulse through the pulse pressure vent allows the pressure wave of the pulse to travel the length of the filter element and the energy in the pulse to effectively dislodge dust from the filter element. The vent also provides an egress path from the filter casing for the dust and debris during the cleaning cycle. The pulse pressure vent can be readily adapted for filter housings of any size, configuration or capacity in a variety of vehicle, equipment and other applications. In addition, the pressure setting, size, configuration and location of the pulse pressure valve between the inlet and outlet ends of the filter casing is selected so that the compressed air pulse can be vented as the pulse travels the length of the filter element, thereby ensuring the entire area of the filter element will be cleaned.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

We claim:

1. A self-cleaning air filter apparatus connected to an associated compressed air source comprising:
   a filter casing defining an interior therein;
   a filter element disposed within the filter casing and having an interior and an exterior thereof, whereby during a filtering cycle a negative pressure differential between the filter element interior and the filter element exterior draws airflow inward through the filter element during a filtering cycle and during a self-cleaning cycle a positive pressure differential between the filter element interior and the filter element exterior forces airflow outward through the filter element,
   a valve mounted to the filter casing and connected to the associated compressed air source for automatically and periodically releasing a pulse of compressed air into the filter element whereby dust is dislodged from the filter element exterior into the filter casing; and
   a selectively openable vent mounted to the filter casing for venting the pulse of compressed air from the filter casing to maintain a positive pressure differential between the filter element interior and the filter element exterior during the cleaning cycle, the vent including a frame and a blocking element mounted for reciprocation in relation to the frame.

2. The air filter of claim 1 wherein the vent opens at a selected internal pressure within the filter casing.

3. The air filter of claim 1 wherein the filter casing includes a sidewall having an opening therein, the blocking element includes a pliable diaphragm shiftably seated over the sidewall opening between an open position spaced from the sidewall opening and a closed position covering the sidewall opening and a spring biasing the diaphragm into the closed position.

4. The air filter of claim 1 wherein the filter casing includes an air inlet at a first end thereof and an air outlet at a second end thereof opposite the first end.

5. The air filter of claim 4 wherein the vent is mounted to the filter casing between the first end of the filter casing and the second end of the filter casing.

6. The air filter of claim 4 wherein the valve includes a nozzle extending into the outlet port for directing the compressed air pulse laterally through the filter element interior toward the first end of the filter casing and radially outward through the filter element.

7. A self-cleaning air filter apparatus connected to a compressed air source comprising:
   a filter casing defining an interior therein, the filter casing includes an air inlet at a first end thereof and an air outlet at a second end thereof opposite the first end, the filter casing also includes a sidewall having an opening therein, a filter element disposed within the filter casing and having an interior and an exterior thereof, whereby during a filtering cycle a negative pressure differential between the filter element interior and the filter element exterior draws airflow inward through the filter element during a filtering cycle and during a self-cleaning cycle a positive pressure differential between the filter element interior and the filter element exterior forces airflow outward through the filter element, a valve mounted to the filter casing and connected to the compressed air source for automatically and periodically releasing a pulse of compressed air into the filter element whereby dust is dislodged from the filter element exterior into the filter casing, the valve including a nozzle extending into the outlet port for directing the compressed air pulse laterally through the filter element interior toward the first end of the filter casing and radially outward through the filter element; and a selectively openable vent mounted to the filter casing over the sidewall opening of the filter casing for venting the pulse of compressed air from the filter casing to maintain a positive pressure differential between the filter element interior and the filter element exterior during the cleaning cycle, the vent including a frame and a pliable diaphragm seated over the sidewall opening and mounted for reciprocation in relation to the frame between an open position spaced from the sidewall opening and a closed position covering the sidewall opening and a biasing member for biasing the diaphragm into the closed position.

8. A self-cleaning air filter apparatus connected to an associated compressed air source comprising:

a filter casing defining an interior therein;

a filter element disposed within the filter casing such that an interior volume is defined within the filter element and an exterior volume is defined between the filter element and the filter casing, whereby during a filtering cycle a negative pressure differential between the interior volume and the exterior volume draws airflow inward through the filter element and during a self-cleaning cycle a positive pressure differential between the interior volume and the exterior volume forces airflow outward through the filter element, a valve in communication with the filter casing and connected to the associated compressed air source for selectively releasing a pulse of compressed air into the interior volume whereby dust is dislodged from an exterior surface of the filter element into the filter casing; and a vent mounted to the filter casing, over an opening therein, for venting the pulse of compressed air from the filter casing to maintain a positive pressure differential between the interior volume and the exterior volume during the cleaning cycle, the vent comprising a frame, a blocking element mounted for reciprocation in relation to the frame and a biasing element for urging the blocking element into a closed position.

9. The apparatus of claim 8 wherein the vent opens at a selected internal pressure within the filter casing.

10. The apparatus of claim 8 wherein the blocking element extends in a single plane when in the closed position.

11. The apparatus of claim 8 wherein the blocking element is flexible.

12. The apparatus of claim 8 wherein the vent further comprises a cover plate mounted to the filter casing via spacers.

13. The apparatus of claim 12 wherein the blocking element is disposed between the cover plate and the opening in the filter casing.

14. The apparatus of claim 8 wherein the vent is mounted to the filter casing between a first end of the filter casing and a second end of the filter casing.

15. The apparatus of claim 8 wherein the valve includes a nozzle extending into the interior space for directing the compressed air pulse laterally through the filter element.

16. The apparatus of claim 8 wherein the vent further comprises a stop spaced from the filter casing and wherein the blocking element is positioned between the stop and the filter casing.

17. The apparatus of claim 16 wherein the stop comprises a cover plate.

18. The apparatus of claim 16 wherein the biasing element is positioned between the stop and the blocking element.

* * * * *